United States Patent [19]

Dugas et al.

[11] Patent Number: 5,304,386
[45] Date of Patent: Apr. 19, 1994

[54] EDIBLE CONTAINER AND PROCESS FOR THE FABRICATION THEREOF

[76] Inventors: Jeffrey J. Dugas; Pammie L. Dugas, both of Box 1356 Garney Rd., Brookfield, Mass. 03872

[21] Appl. No.: 978,155

[22] Filed: Nov. 17, 1992

Related U.S. Application Data

[63] Continuation of Ser. No. 707,693, May 30, 1991, abandoned.

[51] Int. Cl.⁵ .............................................. A21D 8/02
[52] U.S. Cl. ........................................ 426/94; 426/138; 426/139; 426/289; 426/293; 426/549; 426/556
[58] Field of Search ............... 426/556, 549, 138, 139, 426/289, 293, 94

[56] References Cited

U.S. PATENT DOCUMENTS

| | | | |
|---|---|---|---|
| 1,638,480 | 8/1927 | Feybusch | 426/94 |
| 2,365,349 | 12/1944 | MacManus | 426/289 |
| 3,158,486 | 11/1964 | Morck et al. | 426/293 |
| 3,296,956 | 1/1967 | Turner | 99/439 |
| 3,410,691 | 12/1968 | Stanley | 426/94 |
| 4,399,157 | 8/1983 | Caporaso | 426/556 |
| 4,624,855 | 11/1986 | Haas, Sr. et al. | 426/501 |
| 4,658,708 | 4/1987 | Rastoin | 426/289 |
| 4,795,652 | 1/1989 | Cooper | 426/549 |
| 4,812,323 | 3/1989 | Savage | 426/496 |
| 4,892,745 | 1/1990 | Gage et al. | 426/549 |

OTHER PUBLICATIONS

Samuel A. Matz, Equipment for Bakers, 1988 Pan-Tech International, Inc. McAllen, Texas, pp. 342-343, 427-439 (1988).

Primary Examiner—Donald E. Czaja
Assistant Examiner—Mary S. Mims
Attorney, Agent, or Firm—Wolf, Greenfield & Sacks

[57] ABSTRACT

A process for the formation of an edible container, and edible containers produced thereby. The process includes the steps of forming the dough into a generally continuous sheet, positioning the dough on a baking surface, baking the dough on the baking surface, and removing the baked product from the baking surface before heating to remove residual moisture. A crumb mixture may be applied to the surface of the container prior to baking. The edible containers are useful for holding a variety of fillings, including liquid or semi-liquid fillings such as puddings and ice creams.

13 Claims, 2 Drawing Sheets

EDIBLE CONTAINER AND PROCESS FOR THE FABRICATION THEREOF

This application is a continuation of application Ser. No. 07/707,693, filed May 30, 1991, now abandoned.

FIELD OF THE INVENTION

This invention relates to a process utilizing dough in the formation of an edible container, and to the products produced thereby. A crumb mixture may be applied to the surface of the container prior to baking. The containers are useful for holding a variety of fillings, including liquid or semi-liquid fillings such as puddings and ice creams.

BACKGROUND

Although the technology for preparation of edible food containers has been in existence for some time, that technology has been directed to either of two general processes. The first process utilizes a mold and can be used in connection with a pourable batter (e.g., a cookie batter). The second process employs a winding surface such as the outer surface of a mandrel for the formation of a conical or cylindrical shaped container, and can be used in connection with a prebaked wafer or viscous dough (e.g., a pretzel dough). In general, these processes tend to be mutually exclusive with respect to the type of batter or dough employed (i.e., a pourable batter cannot be used in connection with a mandrel-based process). This is particularly true since pourable batters typically increase in fluidity during the heating process. Accordingly, pourable batters such as cookie batters cannot be formed into anything other than a flat shape unless the dough is poured into a mold which includes surfaces for confining the dough and configuring it into a particular shape.

In addition, the inclusion of leavening agents in pourable batters leads to gas formation during baking. Thus, as the increasingly fluid batter is heated within the mold, uneven cooking and distribution of gases may result. These problems become more apparent when attempts are made to prepare an edible container having a thickness greater than a few millimeters. In such applications, bubble formation results in regions in the final product which are more susceptible to breakage and leakage.

One approach to rectifying the problems of uneven heating and gas formation has been to utilize a mold having upper and lower portions which are distinguished by different rates of heat transfer (U.S. Pat. No. 4,812,323 issued to Savage. However, the control of heat transfer rates alone is insufficient to overcome the above-identified problems. Accordingly, the differential heat transfer process disclosed in U.S. Pat. No. 4,812,323 is limited in application to use in combination with molds lacking interior corners, in order to achieve uniform gas dispersion during baking.

The second category of processes for the formation of edible food containers, generally include a winding mold such as the outer surface of a mandrel about which a baked wafer or viscous dough is wrapped. Baked wafer products containing a relatively high sugar content are known as sweet wafer products and can be shaped immediately after baking, while still warm. In practice, a warm, flat wafer is given its final shape in a winding mold in which each flat wafer is rolled around a winding core. The wafer is allowed to cool on the winding core until it acquires a firmer consistency, after which, it is removed from the winding mold. Sweet wafer products are typically thin, crisp and known for their brittle consistency. Alternatively, wafer products may be baked in a casting mold (e.g., cast wafer ice cream cones). Cones produced thereby also tend to be relatively brittle.

In a variation on the wafer-winding mold process, U.S. Pat. No. 4,795,652 issued to Cooper, discloses a method of forming an edible food product using a viscous dough e.g., pretzel dough). The uncooked rolled dough is wrapped around a shaping mandrel, showered with a caustic soda solution, baked and cooled on the mandrel. Application of the caustic soda solution presumably prevents further rising of the dough by stopping the enzymatic reactions associated with yeast-based baked products. Pretzel doughs typically include yeast as a leavening agent.

The afore-mentioned processes result in products which are brittle, limited in taste combinations and not particularly nutritious. Neither do these processes provide for the removal of residual moisture from the baked container in order to enhance the container's shelf life properties. In addition, none of these processes provide for incorporation of a crumb mixture into the surface of the food container which mixture does not appreciably flake off the surface of the food container. Thus, none of the afore-mentioned processes provide for inclusion of a crumb mixture composed of any combination of whole grains, nut fragments, fruit pieces, or candies on the surface of a food container to provide a unique texture and taste experience for the consuming public.

SUMMARY OF THE INVENTION

It is therefore an object of the present invention to provide a process for preparing an edible container having enhanced taste options and a more nutritious composition.

Another object of the present invention is to provide an edible container capable of containing a liquid, or semi-liquid filling.

Another object of the invention is to provide an edible container which is not brittle. A non-brittle container is particularly desirable in connection with edible containers used to hold liquids (e.g., a cup or bowl), since such containers must be capable of withstanding the additional pressure exerted by the liquid.

A still further object of the invention is to provide an edible container having a nutritious composition.

Still another object of the invention is to provide a process which will permit the inclusion and retention of a crumb mixture on the surface of the edible container prior to baking, which crumb mixture may extend beyond the surface of the food container, thereby providing a texture which is currently not found in other edible food containers.

Another object of the invention is to provide a crumb mixture for application onto and penetration into the surface of a food container to provide a unique taste and texture combination. The crumb mixture may include one or more of the following components: whole grains, nut fragments, fruit pieces or other relatively small edible fragments.

Another object of the invention is to provide a baking process which eliminates substantially all of the moisture from the baked containers, thereby enhancing the shelf life of the final baked product.

Yet another object of the invention is to provide a process for preparing the edible containers described in the preceding objects in mass quantity.

These and other objects are realized in an edible container having a substantially uniform thickness and capable of retaining a liquid or semi-liquid filling. An edible container refers broadly to any edible food container prepared from a dough capable of being rolled, which dough is similar in composition and texture to a cracker or pie dough. The container may take a variety of shapes, including a cone, pie pan, bowl, plate or cup. These shapes are illustrative and are not intended to limit the configuration of the edible container in any way.

The container may be formed by winding a rolled dough onto the surface of a mandrel or alternatively, by placing the rolled dough onto a mold. In either case, the dough is cut into a shape which substantially matches that of the mandrel or mold upon which it is placed prior to baking. Leavening agents are either excluded from the dough or present at concentration levels which are less than those concentrations which would result in the formation of bubbles of substantial size in the dough during baking. Thus, the level of leavening agent in the dough is less than that which would result in the formation of regions in the container that would be susceptible to breakage and leakage. Moisture is substantially removed from the baked product by removing the container from the mandrel or mold after baking and transferring the container to a drying oven. The removal of residual moisture trapped between the mandrel or mold and the baked product, substantially improves its shelf life and liquid retention properties.

DETAILED DESCRIPTION OF A PREFERRED EMBODIMENT

A process for the preparation of an edible food container is disclosed in FIGS. 1-8. The dough is formed from standard ingredients well known in the art. In texture and composition, the dough is similar to a cracker or pie dough and is capable of being rolled into a sheet. In a preferred embodiment, the dough is formed into a cone and has the composition as shown in Table 1 (cone mixture A). In yet another preferred embodiment, the dough has the composition as shown in Table 2 (cone mixture B). Sugar substitutes (e.g., NutraSweet or other low calorie sweeteners), corn syrups, honey, or other artificial sweeteners may be used in place of white or brown sugar. Because there is little or no leavening agent present in the dough, it does not rise significantly on baking. Accordingly, the baked product has a relatively hard, non-porous surface which is capable of retaining liquids or semi-liquids.

Figure 1:
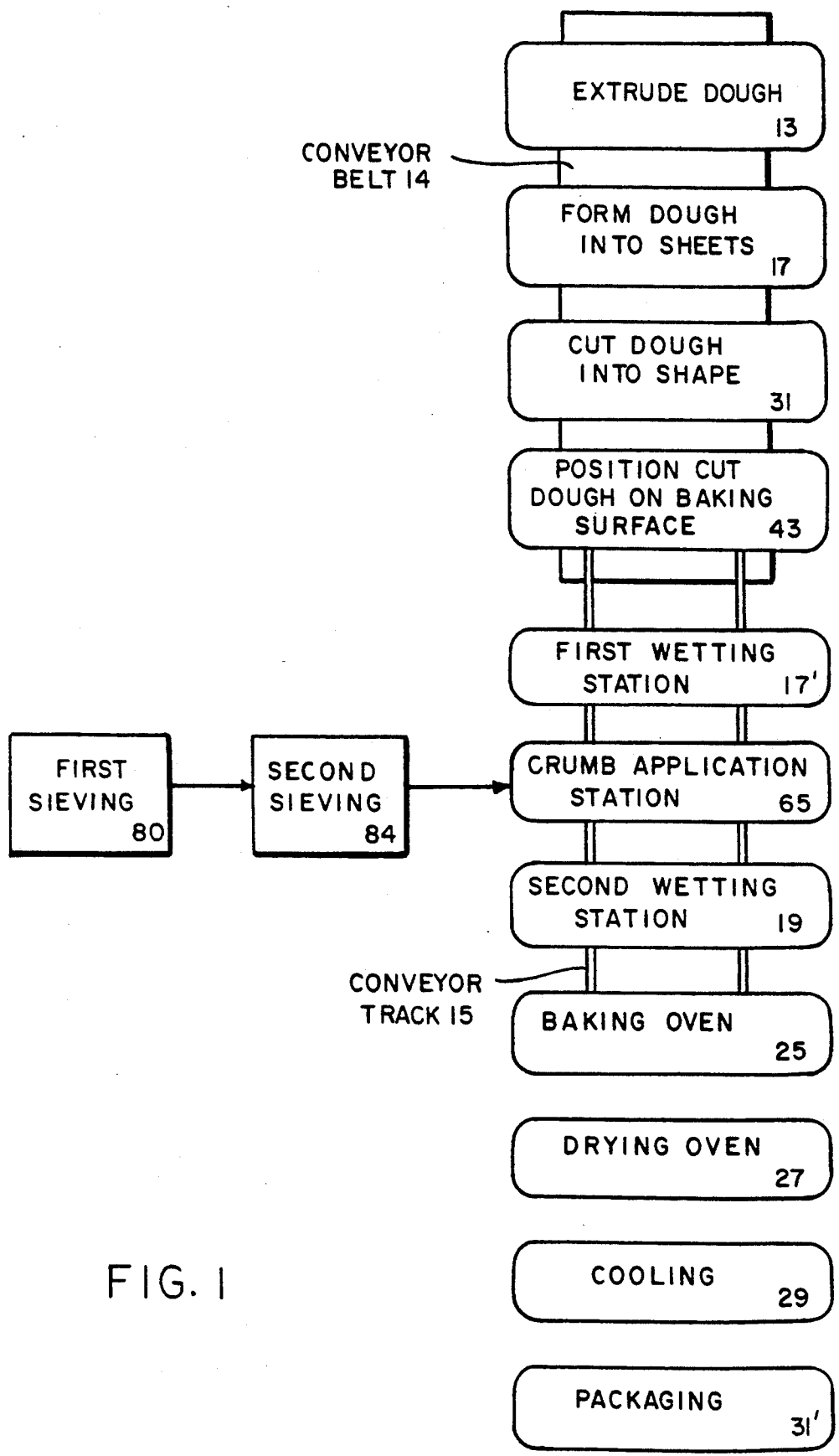
FIG. 1 is a flow diagram of the steps comprising the formation of an edible container.

A flow diagram of the steps comprising the formation of an edible container is shown in FIG. 1. The steps leading up to the shaping of the edible container include: extruding the dough 13, forming the dough into a sheet 17, cutting the dough 31 and positioning the cut dough 43. FIG. 1 also shows first sieving station 80 and second sieving station 84, through which crumb particles may be selected on the basis of size prior to application onto the dough. Also shown in FIG. 1 are the stations through which the shaped edible container is transported on its way to baking and packaging. These stations include: first wetting station 17', crumb application station 65, second wetting station 19, baking station 25, drying station 27, cooling station 29 and packaging station 31'.

Figure 2:
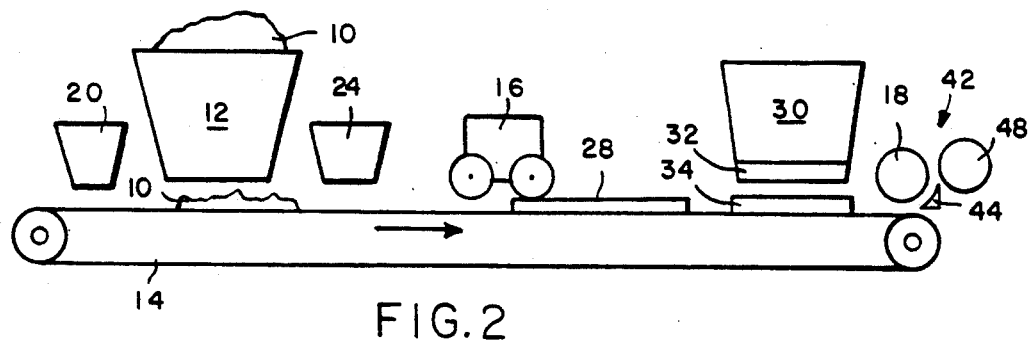
FIG. 2 shows apparatus for performing the steps leading up to the shaping of the edible container.
Figure 3:
FIG. 3 shows a cut dough piece in accordance with the preferred embodiment.

The apparatus for performance of the steps leading up to the shaping of the edible container is shown in FIG. 2 and will be discussed herein. A dough 10 is formed by thoroughly mixing ingredients using conventional mixing devices (not shown). When mixing is complete, as judged by the ability of dough 10 to form a pliable ball which can hold its shape, the dough is introduced into an extruder 12 (Step 13). Extruder 12 is located above a substantially horizontal conveyor belt 14. Conveyor belt 14 transports the extruded dough from the extruder through a roller assembly 16 and finally to a shaping mandrel 18. Conveyor belt 14 preferably has sufficient width to accommodate at least two shaping mandrels 18 positioned next to one another at one end of the belt. Only a single mandrel is shown in the figures in order to more clearly describe the process.

A first flour sifter 20 is also located above conveyor belt 14, but at a position upstream of extruder 12 (i.e., the extruder is positioned between flour sifter 20 and roller assembly 16). As will be described herein, the need for flour sifters is in part dependent upon the surface of belt 14 (i.e., whether it is formed of a non-stick material) as well as on the configuration of roller assembly 16). Thus, flour sifter 20 is not required in the preferred embodiment.

Flour sifter 20 applies a thin coat of flour onto belt 14, to ensure that the belt is lightly floured before contacting the extruded dough. The flour coating ensures that the bottom surface of the extruded dough will not stick to conveyor belt 14. Alternatively, belt 14 may be formed of a non-stick material or coated with a non-stick coating to prevent sticking of the extruded dough to conveyor belt 14.

TABLE 1

| CONE MIXTURE A | |
|---|---|
| Ingredient | Percent Composition |
| White Flour | 52.0 |
| Brown Sugar** | 7.5 |
| White Sugar** | 15.0 |
| Water | 11.0 |
| Butter* | 9.0 |
| Whole Wheat Flour | 5.0 |
| Salt | 0.5 |
| Ginger | 0.4 |
| All Spice | 0.4 |
| Cinnamon | 0.4 |

*margarine or other shortening may be substituted.
**Sugars may be replaced by any sweetener (e.g., corn syrup, honey, artificial sweeteners) with the percentage of water and butter adjusted accordingly.

TABLE 2

CONE MIXTURE B

| Ingredient | Percent Composition |
| --- | --- |
| White Flour | 26.0 |
| Oats | 33.0 |
| Whole Wheat Flour | 3.0 |
| Butter* | 8.0 |
| Brown Sugar** | 5.0 |
| White Sugar** | 10.0 |
| Water | 15.0 |
| Salt | 0.5 |

*Margarine or other shortening may be substituted.
**Sugars may be replaced by any sweetener (e.g., corn syrup, honey, artificial sweeteners) with the percentage of water and butter adjusted accordingly.

Following extrusion, dough 10 is transported on belt 14 to a second flour sifter 24. Flour sifter 24 applies flour onto the upper surface of dough 10 to prevent sticking of the dough to roller assembly 16 when the dough is formed into a sheet. The rollers of roller assembly 16 may be formed of a non-stick material or coated with a non-stick coating to reduce or eliminate the need for flour application by flour sifter 24. Dough 10 is transported on belt 14 through the roller assembly, wherein the dough is formed into a continuous dough sheet 28 of a predetermined thickness (Step 17).

It will be apparent to those skilled in the art that roller assembly 16 is not restricted to a particular configuration and that any of a variety of configurations may be utilized to form the dough into a generally continuous sheet. Thus, roller assembly 16 need not be positioned downstream from extruder 12, but may be positioned vertically between extruder 12 and belt 14. In such a vertical configuration, dough sheet 28 is formed prior to the dough contacting belt 14, thereby obviating the need for flour sifter 24. Any of a variety of commercially available roller assemblies may be used in accordance with the process disclosed herein.

Dough sheet 28 is carried on belt 14 to one or more cutting assemblies 30, positioned side by side (Step 31). Only one cutting assembly is shown in FIG. 2 in order to more clearly illustrate the disclosed process. Cutting assembly 30 includes a dough cutter 32, which may be configured in any of a variety of shapes. Generally, the shape of the dough cutter is selected so that the shape of a piece of a cut dough 34 corresponds to the shape of a baking surface. Excess dough (i.e., dough which falls outside the area prescribed by cutter 32) is thereafter returned to extruder 12, by hand or by suitable mechanical elements.

The baking surface may be a mold having interior and exterior surfaces (e.g. a plate or cup mold) or a winding surface such as that of a mandrel. If the baking surface is a mold, dough sheet 28 is cut substantially in the flattened shape of the mold and is then positioned either manually or by suitable mechanism, on either the exterior or interior surface of the mold. In a preferred embodiment, the baking surface is the surface of a mandrel and cut dough 34 has the shape of a flattened cone (FIG. 2). Cut dough 34 may be manually or mechanically positioned on the mandrel (Step 43).

Optionally, a wetting agent applicator (not shown) may be used to spray or otherwise apply a wetting agent to pieces 34 prior to placement of the cut dough piece on the mandrel. Thereafter, the wetting agent is preferably lightly brushed into the surface of the dough to ensure that the dough is completely covered with wetting agent. Such wetting agents may include water, or any of a variety of liquids. Accordingly, wetting agents refer generally to any ingestible liquid or solution, which on contacting the dough surface, increases its stickiness.

Figure 4:
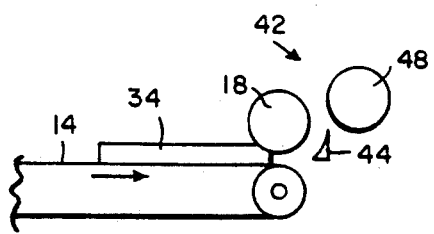
FIG. 4 shows a cut dough piece approaching a shaping mandrel.
Figure 5:
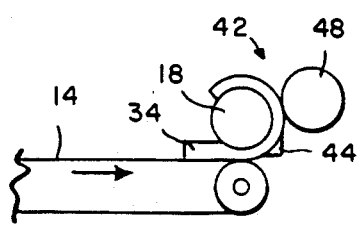
FIG. 5 shows a cut dough piece in the process of being wrapped around a shaping mandrel.
Figure 6:
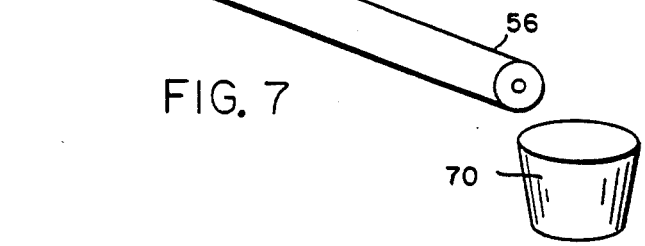
FIG. 6 shows a cut dough piece completely wrapped around a shaping mandrel.

FIGS. 4-6 illustrate the formation of an edible container in the shape of a cone. In FIG. 4, conveyor belt 14 carries cut dough pieces 34 to a plurality of shaping assemblies 42, only one of which is shown. The shaping assembly includes a fixed directing portion 44, a free-rolling shaping mandrel 18, and an opposing roller 48. Directing portion 44 protrudes between the opposing roller and the mandrel. As illustrated in FIG. 4, belt 14 carries dough pieces 34 toward the shaping assembly until the pieces contact mandrel 18. The continued forward motion of the conveyor belt forces the cut dough onto directing portion 44 and eventually forces the dough to move between mandrel 18 and opposing roller 48 (FIG. 5). Opposing roller 48 may be free-rolling or preferably, powered to rotate at a rate of speed to allow rotation in concert with belt 14. Opposing roller 48 is preferably formed of or coated with a non-stick material (e.g., TEFLON) to facilitate wrapping of the dough around mandrel 18. Since conveyor belt 14 has been floured, the bottom surface of pieces 34 are coated with flour and accordingly, pieces 34 do not adhere to directing portion 44. In contrast, the upper surface of pieces 34 are more lightly floured by the time pieces 34 reach the shaping assembly. This is because some of the flour originally present on the upper surface of dough 10 has been pressed into the dough by roller assembly 16 during dough sheet 28 formation. If in addition, an optional wetting agent is applied to the upper surface of dough piece 34, increasing the stickiness of the upper surface, the upper surface of the dough will adhere more strongly to the mandrel as it is rolled thereon. Accordingly, the continued forward motion of conveyor belt 14 eventually forces piece 34 to completely wrap around mandrel 18, as shown in FIG. 6. Thereafter, opposing roller 48 exerts sufficient pressure against wrapped dough 50 to seal the seam formed where the dough ends overlap, thereby effectively holding wrapped dough 50 in place on mandrel 18 during the subsequent processing steps. The driving force to wrap dough 34 around mandrel 18 is not limited to the forward motion of belt 14 or by providing a powered opposing roller 48, but may be alternatively accomplished by providing a powered mandrel 18.

In the preferred embodiment, each mandrel 18 is cone-shaped, hollow with relatively thin walls, and formed of a heat conductive material to facilitate baking of the dough surface adjacent the mandrel. Although it is not necessary to grease or otherwise lubricate the mandrel prior to wrapping the dough, the mandrel may optionally include a non-stick surface (e.g., TEFLON) to facilitate removal of the final product after baking. The characteristics described herein are equally applicable to any baking surface used in connection with the disclosed process and thus, would also apply to a mold. Accordingly, the walls of a mold are also preferably thin and formed of a heat conductive material (e.g., aluminum) in order to facilitate baking of the dough surface adjacent the mold surface. Likewise, the mold may optionally include a non-stick surface to facilitate removal of the final product after baking. The inclusion of a non-stick baking surface is intended to eliminate the need for oils or other lubricates to facilitate removal of the baked product following baking.

In the preferred embodiment, the process for formation of an edible container in the shape of a cone is automated. Accordingly, an attachment rod (not shown) is attached at one end to mandrel 18 and is detachably attached at its opposite end to a conveyor track 15, as depicted in FIG. 1. FIG. 1 further illustrates transport of the loaded mandrel (i.e., mandrel with wrapped dough 50 attached) to various locations or stations for further processing. Further processing includes for example such steps as wetting the dough surface and application of a crumb mixture to the wetting surface. Prior to further processing, the cone tip is mechanically crimped to seal the tip, thereby preventing leakage.

Preferably, a crumb mixture is applied to the surface of wrapped dough 50. In order to apply a coating to the exterior surface, wrapped dough 50 is preferably sprayed with a wetting agent at first wetting station 17', followed by optional lightly brushing and/or scoring of the dough surface to ensure that the exterior surface is completely covered with wetting agent. The composition of the wetting agent applied at station 17' may be the same or different than that of the optional wetting agent applied prior to baking. Regardless of composition, both wetting agents serve the same purpose (i.e., to increase the stickiness of the dough surface). Thus, in the preferred embodiment, application of the wetting agent to wrapped dough 50 at wetting station 17' makes the dough more receptive to crumb mixture 62. Alternatively, the crumb mixture may be pressed into the dough surface without prior wetting of the dough surface.

The crumb mixture is preferably passed through at least one sieve before application onto the cone surface (FIG. 1). A first sieving station 80 serves to eliminate crumb particles from the crumb mixture which are sufficiently large to potentially penetrate the cone wall or extend sufficiently beyond the cone surface to render stacking and packaging of the baked product difficult or impractical. A second sieving station 84 (FIG. 1) is preferably included to further separate larger from smaller crumbs. The preparation of crumb mixtures having different size particles allows for the sequential application of two differently sized particles on the dough surface, thereby ensuring that substantially all of the cone surface is covered by the crumb mixture. Thus, the application onto the cone surface of smaller crumb particles following the application of larger crumb particles ensures that the surface areas of the cone which were not covered by the larger particles are filled in by smaller particles.

Figure 7:
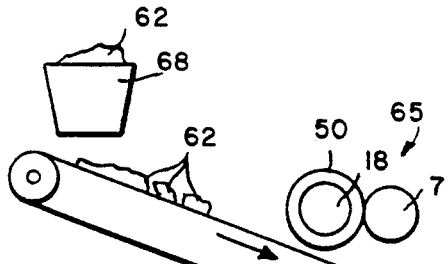
FIG. 7 shows a crumb application station in accordance with the preferred embodiment.

Crumb application station 65 is located above a second conveyor belt 56 and encompasses those features of the process directed to application of a crumb mixture 62 onto the exterior surface of the wrapped dough 50 (FIGS. 1 and 7). Preferably, a separate crumb application station is employed for each crumb mixture (e.g., a crumb mixture containing small particles would be applied at one station and a mixture containing larger particles would be applied at a separate crumb application station.).

FIG. 7 shows a crumb application station 65 for applying a crumb mixture containing particles of a preselected size onto the exterior surface of wrapped dough 50. Also shown in FIG. 7 are a substantially non-horizontal conveyor belt 56, a crumb dispenser 68 located at the proximal end of the belt, and a crumb collector 70 located at its distal end. To incorporate crumb mixture 62 into the exterior surface of wrapped dough 50, the mandrel is transported on powered conveyor track 15 to station 65. Crumb station 65 is located between the dispenser and the collector. Thus, crumbs dispensed from dispenser 68 flow down the conveyor belt until reaching the loaded mandrel. In a preferred embodiment, the crumbs stick to the wetted exterior surface of wrapped dough 50 and are pressed lightly into the surface of the dough by a second opposing roller 72. Mandrel 18 or opposing roller 72 may be either powered or free to rotate. In the latter instance, the forward motion of belt 56 provides the driving force for rotating the mandrel as the crumbs are applied thereon. Crumbs which have not bound to wrapped dough 50 continue to flow down conveyor belt 66 to crumb collector 70, where they are temporarily stored before being returned to the crumb dispenser.

To complete the crumb application process, the mandrel is preferably transported to a second wetting station 19, where the crumb-coated dough is sprayed a second time with a wetting agent to ensure that the crumbs stay bound to the cone exterior during baking.

In a preferred embodiment, crumb mixture 62 has the composition shown in Table 3. In a second preferred embodiment, the crumb mixture has the composition shown in Table 4. In a most preferred embodiment, the crumb mixture of Table 3 is used in combination with the dough recipe provided in Table 1. In yet another preferred embodiment, the crumb mixture of Table 4 is used in combination with the dough recipe provided in Table 2. However, variations in the recipes disclosed in the afore-mentioned tables as well as variations in combining the different doughs and crumb mixtures can be used without departing from the spirit of the present invention. Thus, crumb mixture 62 is defined to include small pieces of nuts, candied fruit, dried fruit, any combination of grains (e.g., granola mixtures), candies as well as any of the ingredients provided in Tables 3 and 4, or any combination thereof. The crumb mixture may contain a single component or a variety of the above-mentioned components.

The crumb mixture is preferably prepared by first thoroughly mixing the liquid ingredients with the small pieces to result in the formation of clumps of pieces. The addition of flour serves to completely coat the pieces, thereby forming flour-coated pieces which are more suitable for coating onto the wetted surface of the dough (i.e., as more flour is added, the clumps breakdown into smaller particles). The addition of flour also facilitates bonding of the pieces to the wetted dough since the flour-coated pieces tend to stick better to a wetted surface. An additional wetting step, following coating of the crumb mixture on to the dough surface, further facilitates bonding of the mixture to the dough surface during baking.

TABLE 3

| CRUMB MIXTURE A | |
|---|---|
| Ingredient | Percent Composition |
| Butter* | 24.0 |
| Ginger | 1.0 |
| All Spice | 1.0 |
| Cinnamon | 1.0 |
| White Flour | 43.0 |
| White Sugar** | 16.0 |
| Brown Sugar** | 16.0 |
| Salt | 0.5 |
| Water | 5.0 |

*Margarine or other shortening may be substituted.
**Sugars may be replaced by any sweetener (e.g., corn syrup, honey, artificial sweeteners) with the percentage of water and butter adjusted accordingly.

TABLE 4

CRUMB MIXTURE B

| Ingredient | Percent Composition |
| --- | --- |
| Butter* | 5.0 |
| White Flour | 21.0 |
| White Sugar** | 6.0 |
| Brown Sugar** | 5.0 |
| Water | 5.0 |
| Rolled Oats | 63.0 |
| Salt | 0.5 |

*Margarine or other shortening may be substituted.
**Sugars may be replaced by any sweetener (e.g., corn syrup, honey, artificial sweeteners) with the percentage of water and butter adjusted accordingly.

The process of the present invention further includes baking station 25 and drying station 27 (FIG. 1). Any of a variety of conventional ovens known to those skilled in the art may be utilized for baking and drying the container. In the preferred process, the loaded mandrel is transported by conveyor track 15 through baking station 25. The speed at which the conveyor track transports the loaded mandrels through station 25 is dependent upon oven temperature (i.e., conveyor speed is reduced in an oven having a lower temperature and is increased in an oven having a higher temperature). Baking is initially judged to be complete when the crumbs on the exterior surface are well browned. If crumbs have not been applied to the exterior surface, baking is initially judged to be complete by observing whether the baked container substantially retains its shape if removed from the baking surface (i.e. the mandrel or mold) and allowed to rest horizontally. Thereafter, the baking time is set at the time sufficient to achieve complete baking as determined by the above-identified criteria.

The baked cone is carefully removed by hand or by suitable mechanical elements from mandrel 18 by simultaneously applying approximately equal pressure to all sides of the cone to disengage it from mandrel 18. The baked cone is then transported to drying station 27 (FIG. 1). If the baked product is formed on a mold, it is likewise carefully removed by hand or suitable mechanic means from the baking surface before being introduced into a drying oven. The drying oven is necessary to remove residual moisture trapped between the baked product (e.g., cone) and the baking surface (e.g., mandrel). The elimination of moisture provides the baked product with a greater compressive strength for a longer period of time compared to conventional wafer or cake cones stored under comparable humidity conditions.

Figure 8:
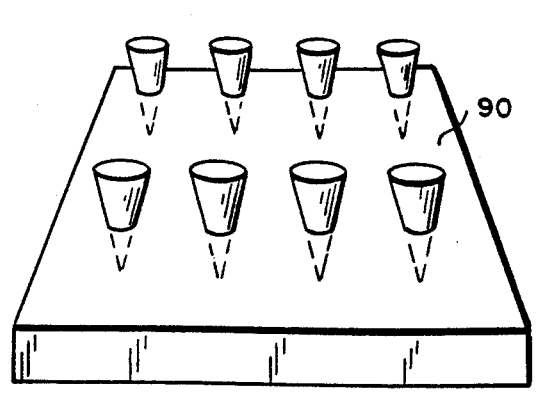
FIG. 8 shows a fixture for holding an edible container in an upright configuration during drying.

The baked cones are introduced into drying station 27 in either a horizontal or vertical position. If introduced in a vertical position, the cones are positioned in a suitable fixture 90 with the cone tip down, to facilitate moisture removal (FIG. 8). Since the function of the drying oven is removal of moisture rather than baking per se, the temperature of the drying oven is substantially less than that of the baking oven. The baked cones remain on fixture 90 until they have cooled sufficiently to be packaged mechanically or by hand using methods standard to the art. An optimum shelf life is not achieved unless the product has been thoroughly cooled prior to packaging.

Having described the invention in detail, those skilled in the art will appreciate that numerous modifications can be made therein without departing from its spirit. Therefore, it is not intended to limit the breadth of the invention to the embodiments illustrated and described. Rather, the scope of this invention is to be determined by the appended claims and their equivalents.

What is claimed is:

1. A process for forming an edible container comprising the steps of:
   (a) configuring the dough into a generally continuous sheet;
   (b) cutting the sheet of dough into a plurality of dough pieces, each dough piece having a predetermined shape;
   (c) positioning the dough piece onto a baking surface to form a generally continuous covering of dough on the baking surface, said dough piece having a contacting surface in contact with the baking surface;
   (d) baking the dough piece while it is positioned on the baking surface until the dough piece can retain its shape without the baking surface;
   (e) removing the shaped baked dough piece from the baking surface to expose any moisture trapped between the baked dough piece and the baking surface during the baking step;
   (f) introducing the baked dough piece into a drying oven in a manner such that the contacting surface is exposed, thereby facilitating removal of the moisture trapped between the contacting surface and the baking surface; and
   (g) heating the shaped baked dough piece at a temperature substantially less than that of the baking step to remove the moisture trapped between the contacting surface and the baking surface.

2. A process as claimed in claim 1, further including the step of applying a crumb mixture containing crumb particles to the dough piece prior to baking.

3. A process as claimed in claim 2, further including the step of applying a wetting agent to the dough piece prior to application of the crumb mixture.

4. A process as claimed in claim 3, wherein the wetting agent is brushed into the dough prior to application of the crumb mixture.

5. A process as claimed in claim 2, wherein said crumb particles are selected on the basis of particle size by passing a mixture of crumb particles through a sieve and selecting at least one of the particles which pass through the sieve and the particles which are retained by the sieve.

6. A process as claimed in claim 5, wherein at least two crumb mixtures having crumb particles of different sizes are applied to the dough piece.

7. A process as claimed in claim 6, wherein a first crumb mixture containing crumb particles of a larger size is applied to the dough piece, followed by application of a second crumb mixture containing crumb particles of a smaller size to the dough piece.

8. A process as claimed in claim 1, further comprising applying a wetting agent to at least one of the dough piece and the baking surface prior to positioning the dough piece on the baking surface.

9. A process as claimed in claim 1, wherein the baking surface is a mold having an interior surface, an exterior surface and a shape selected from the group consisting of (a) a cup, (b) a bowl, (c) a pie pan, (d) a plate and (e) a cone.

10. A process as claimed in claim 9, wherein the dough piece is positioned on the interior surface of the mold.

11. A process as claimed in claim 9, wherein the dough piece is positioned on the exterior surface of the mold.

12. A process as claimed in claim 1, wherein the baking surface is the winding surface of a mandrel having a substantially conical shape.

13. A process as claimed in claim 12, wherein the dough piece has dimensions such that there is some folding of the dough upon itself when the dough piece is positioned on the mandrel, and further comprising applying pressure to the overlapping dough.

* * * * *